United States Patent
Ritter et al.

[15] 3,641,305
[45] Feb. 8, 1972

[54] SPUD WELDING METHOD

[72] Inventors: Ralph Kenneth Ritter, Moorestown; Charles C. Pease, Pennsauken; Elliott J. Fay, Willingboro, all of N.J.

[73] Assignee: Omark Industries, Inc., Portland, Oreg.

[22] Filed: Apr. 20, 1970

[21] Appl. No.: 30,186

Related U.S. Application Data

[60] Division of Ser. No. 803,851, Mar. 3, 1969, Pat. No. 3,508,028, which is a continuation-in-part of Ser. No. 633,844, Apr. 26, 1967, Pat. No. 3,555,238.

[52] U.S. Cl. ................................219/99, 219/107, 219/137
[51] Int. Cl. ..............................................................B23k 9/20
[58] Field of Search..................219/98, 99, 102, 107, 106, 219/137; 29/491

[56] References Cited

UNITED STATES PATENTS

| | | | |
|---|---|---|---|
| 2,847,958 | 8/1958 | Norton et al. | 29/491 |
| 3,110,103 | 11/1963 | Davey | 29/491 |
| 1,679,701 | 8/1928 | Wysong | 219/106 |
| 2,623,974 | 12/1952 | Prucha | 219/98 |

*Primary Examiner*—R. F. Staubly
*Attorney*—Charles F. Duffield

[57] ABSTRACT

Apparatus and method for welding hollow studs (spuds) over a hole in a workpiece which includes the use of a hollow arc shield disposed within the hollow spud and having one end thereof projecting into the hole in the workpiece to provide alignment for the spud over the hole and to maintain the hole free of molten metal during the welding operation. The spud preferably includes a chamfer in the weldable end thereof. The chuck for retaining the spud includes a second chuck therein for retaining one end of the internal arc shield and serves both as a retainer for the arc shield and as a stop member for the spud.

1 Claims, 4 Drawing Figures

3,641,305

PATENTED FEB 8 1972

INVENTORS
RALPH K RITTER
ELLIOTT J FAY
CHARLES C. PEASE

BY Charles F Duffield
ATTORNEY 3,641,305

SPUD WELDING METHOD

This application is a division of application Ser. No. 803,851 filed Mar. 3, 1969, now U.S. Pat. No. 3,508,028, issued Apr. 21, 1970, which in turn is a continuation-in-part of application Ser. No. 633,844 filed Apr. 26, 1967, now U.S. Pat. No. 3,555,238, issued issued Jan. 12, 1971.

BACKGROUND OF INVENTION

The present invention applies to the art of stud welding and, more specifically, to apparatus and methods of welding a spud over a hole in a workpiece.

There are many industrial applications where a tubular member must be welded over an opening or hole in a plate. An example of one such application is the welding of fittings to a boiler for the attachment of gages, valves etc. In most of these applications, access is available only to one side of the metal plate to which the tubular member is to be welded.

Such tubular members are, at present, welded over the holes by conventional hand welding techniques. Such hand welding techniques are, of course, quite time consuming and thus very costly in the industry.

OBJECTS AND SUMMARY OF INVENTION

It is the principle object of the present invention to provide a method and apparatus for welding spud by means of the electric stud welding technique.

It is a further object of the present invention to improve the quality of the weld between the spud and workpiece and maintain the hole in the workpiece free from molten metal by use of an internal arc shield.

It is a further object of the present invention to provide a welding gun having an improved chuck which is capable of receiving both the stud and the internal arc shield assembly.

The present invention carries out the foregoing objects by utilizing an internal arc shield within the hollow stud or spud. The internal arc shield is generally of external configuration complimentary with the internal configuration of the spud. One end of the arc shield includes an end portion thereof which is of configuration complimentary with the hole over which the stud is to be welded and is adapted to pass through the hole when the stud is in place. The arc shield serves both to locate the stud properly over the hole and, also, to prevent the molten metal from flowing into the hole thus blocking the hole in the welding operation. In a preferred embodiment, the internal arc shield is formed of a hollow refractory material which may be easily disintegrated and removed from the hole after completion of the welding operation.

The welding apparatus includes a first chuck which resiliently grips and retains the spud to be welded. Disposed within the first chuck is a second chuck which is adapted to grip and retain the internal arc shield when disposed within the spud. The second chuck is threadedly engaged in the first chuck at one end thereof and the opposite end includes a shoulder which serves as a stop for the stud within the first chuck. The threaded engagement of the first and second chucks permit relative adjustment of the two chucks in, respect to each other to accommodate different lengths of spuds.

Other objects and advantages of the present invention will appear from the detailed description thereof taken in view of the drawings.

DETAILED DESCRIPTION OF INVENTION

Figures 1, 2, 3, 4:
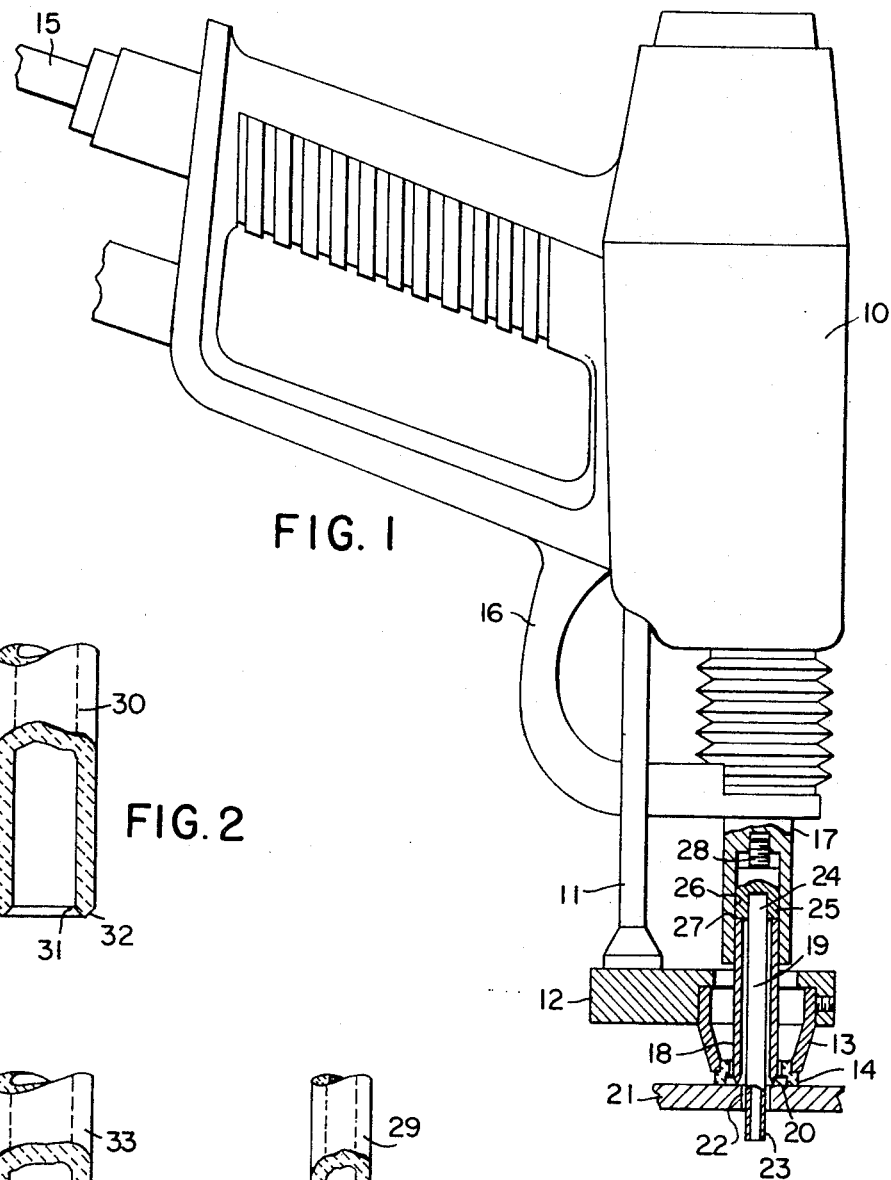
FIG. 1 is a side elevational view partly in section showing the spud and internal arc shield of the present invention in place within the chuck assembly of the present invention.
FIG. 2 is a side elevation partly in section of a spud according to the present invention.
FIG. 3 is a side elevational view partly in section showing a further embodiment of spud of the present invention.
FIG. 4 is a side elevational view partly in section of the internal arc shield of the present invention.

The internal arc shield, supud and chuck of the present invention are shown in FIG. 1 in use with a stud welding gun 10. The stud welding gun 10 may be of the type disclosed in application Ser. No. 381,991 by Frank K. Kelman filed July 13, 1964, now U.S. Pat. No. 3,445,619, although the invention is not limited to such a gun as there disclosed.

The stud welding gun 10 includes a leg 11 which supports a foot piece 12. Within the foot piece 12, there is disposed an arc shield retainer 13 which supports and positions an arc shield 14 around the external periphery of the end of the stud to be welded. The welding gun is controlled through a conductor 15 and the welding current for the welding process is supplied through welding a conductor 16 to a metalic chuck 17. To this point, the welding gun 10 is as a number of conventional welding guns in use and the operation thereof is well understood by those skilled in the art.

In accordance with the present invention, the chuck 17 is modified so as to receive and hold a hollow spud 18. Disposed within the spud 18 is an internal arc shield 19.

The welding end of the stud 20 is placed in engagement with the workpiece 21 and centered over the hole 22 about which the spud is to be welded. The internal arc shield 19 has one end 23 thereof of configuration generally complimentary with the hole 22 in the workpiece and is of such length that, when disposed within the chuck 17, the end 23 of the arc shield will extend through the hole 22 in the workpiece 21.

The opposite end 24 of the arc shield is retained in place by a second chuck member 25. The chuck member 25 includes resilient fingers 26 thereon. The ends 27 of the resilient fingers provide a stop for the opposite end of the stud 18.

The opposite end of the chuck 25 includes a threaded extension 28 thereon which threadedly engages the chuck 17. In this manner, relative adjustment may be made between the chuck 25 and the larger chuck 17 to accommodate for different lengths of spuds.

In use, the spud and arc shield are inserted into their respective chucks and the arc shield inserted into the hole 22. The arc shield serves to align the stud 18 properly over the hole in preparation for the welding operation. Upon the initiation of the welding current, the end 20 of the spud and the contiguous portion of the workpiece will become molten and fusion bonding will result. The presence of the internal arc shield 19 within the hole will properly form an internal fillet around the end of the spud 18 and, as well, prevent the molten metal from falling into the hole 22. The external arc shield 14 serves to form a fillet around the external periphery of the spud in a manner well known to those skilled in the art.

Following the completion of the welding cycle, the gun is withdrawn from the spud and the internal arc shield 19 withdrawn from the hole 22.

In some instances, the internal arc shield 19 may remain within the hole 22 whenever the gun is pulled away from the spud. This quite often occurs due to the presence of the molten metal surrounding the hole 22 which locks the internal arc shield within the hole. When this occurs, the internal arc shield may be removed by fracturing the arc shield with a percussive blow.

In accordance with the present invention as shown in FIG. 4, an internal arc shield 29 of hollow configuration may be employed. The hollow arc shield 29 will function exactly as the solid arc shield for the purposes of aligning the stud and keeping the hole free of molten metal. However, the hollow arc shield has a further advantage of being easily destructed for removal from the hole following the completion of the welding process.

The configuration of the welding end of the spud has been found to be important. The best configuration from the standpoint of ease of welding and of bonding strength has been found to be that shown in the spud 30 in FIG. 2. The spud 20 includes both an internal and external chamfer 31 and 32 respectively.

Another configuration which has been found successful is shown in FIG. 3. The spud 33 of this configuration includes an external chamfer 34 on the welding end thereof.

In one embodiment, the spuds welded were of ⅝ inch outside diameter and of 0.400 inch inside diameter. The hole over which they were welded was of 0.400 diameter and the inside and outside diameters of the internal arc shield were three-eighths and one-fourth inch respectively.

It is anticipated that the spud welding apparatus and methods of the present invention may be employed either with the arc or the capacitor discharge welding methods.

The present invention has been described in respect to the particular embodiments thereof shown in the drawings but no limitation is thereby intended but instead the scope of the invention is to be interpreted in view of the appended claims.

We claim:

1. The method for employing a stud welding gun for welding a hollow stud over a hole in a workpiece while maintaining the hole free of molten metal and in communication with the interior of the stud comprising the steps of:

inserting one end of the hollow stud in place in the welding gun, with the opposite end thereof projecting from the welding gun, positioning the first end of a refractory and electrically nonconductive internal arc shield within the opposite end of the hollow stud while maintaining the opposite end of the internal arc shield projecting from the opposite end of the hollow stud;

positioning an external arc shield around the external surface of the opposite end of the hollow stud;

inserting the opposite end of the internal arc shield into the hole in the workpiece prior to welding to align the hollow stud over the hole;

discharging an electric current across the hollow stud and workpiece to effect heating and welding thereof while maintaining the internal arc shield within the hollow stud and hole in the workpiece and the external arc shield around the opposite end of the hollow stud to confine the arc and molten metal between the internal and external arc shields to form a weld base fillet and leave the hole free of molten metal;

removing the stud welding gun from the hollow stud; and removing both the internal and external arc shields from their respective positions.

* * * * *